May 31, 1949.    R. S. FOX    2,471,737

AIR GAUGE

Filed Nov. 30, 1946

INVENTOR
*R. S. Fox*
BY *Joseph J. Schofield*
ATTORNEY

Patented May 31, 1949

2,471,737

UNITED STATES PATENT OFFICE 2,471,737

AIR GAUGE

Raymond S. Fox, West Hartford, Conn., assignor to Niles-Bement-Pond Company, West Hartford, Conn., a corporation of New Jersey Application November 30, 1946, Serial No. 713,201

4 Claims. (Cl. 73—37.5)

This invention relates to air or pneumatic gages, and more particularly to gages of this type for quickly gaging internal dimensions of articles to an extreme precision.

An object of the invention is to provide a gage head which will limit the discharge of air from its gaging nozzles when work pieces are removed from the gaging head during gaging operations.

A feature that enables the above object to be accomplished is that a slidable collar, fitting easily over the cylindrical surface of the gaging head, is provided so that when no work piece is being gaged the collar will move into a position over the discharge nozzles of the gaging head and restrict the discharge of air from the nozzles, thus maintaining at all times a substantial pressure within the gage head and upon the dimension indicating pressure gage mounted on the head, the collar being retracted to an inoperative position when a work piece is placed in gaging position on the head.

Another object accomplished by the provision of discharge restricting means when gaging is not being effected is that several gaging heads may be coupled to the same reservoir, the pressure of which is controlled by a single regulating device, the air flow from each gage head being so slight and so uniform during and between successive gaging operations that variations in pressure of the supply reservoir controlled by the pressure regulating device will be so slight that they will not adversely or appreciably affect the accuracy of the gaging operation.

And finally it is an object of the invention to provide a single pressure regulating device from any convenient source of air under pressure delivering air to a supply reservoir in the form of an elongated supply line to which a number of individual gaging heads, each adjusted for any dimension being gaged, may be attached and from which air to the gaging heads may be furnished at a constant and predetermined regulated pressure.

With the above and other objects in view the invention consists in the features of construction and operation set forth in the following specification and illustrated in the accompanying drawing.

In the accompanying drawing annexed hereto and forming a part of this specification, the invention is shown embodied in a group of small gage heads individually adjusted for the same or different predetermined dimensions, but it will be understood that the invention can be otherwise embodied and that the drawings are not to be construed as defining or limiting the scope of the invention, the claims appended to this specification being relied upon for that purpose.

In the above-mentioned drawing there is shown but one embodiment of the invention which is now deemed preferable, but it is to be understood that changes and modifications may be made within the scope of the appended claims without departing from the spirit of the invention.

In the operation of air gages it is essential that the gaging head be furnished with a closely regulated and non-fluctuating supply of air at a predetermined uniform pressure and it has been the usual practice to couple each gaging head directly to its own pressure regulating device. This method has been deemed necessary up to the present for the reason, among others, that the discharge of air through the discharge nozzles in the gaging head varies very widely, dependent upon whether a work piece is in position for gaging operation or whether the discharge nozzles are uncovered. It has been found, therefore, that by restricting the discharge of air from these gaging nozzles between gaging operations, the discharge of air will be very materially restricted and the amount of air discharged will be substantially uniform regardless of whether gaging pieces are being applied to their gaging position on the gaging head.

Figure 2:
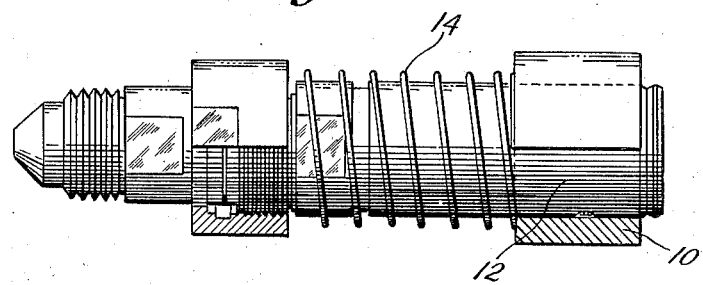
Fig. 2 is a side elevation of a gaging head made according to the present invention having its discharge restricting collar in its nozzle covering position assumed when no work piece is in gaging position thereon.
Figure 3:
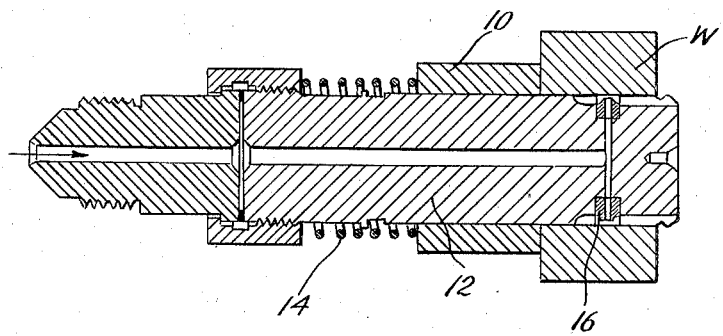
Fig. 3 is a central sectional view of the gaging head shown in Fig. 2, with a work piece in gaging position.

In order to restrict the discharge of air when gaging operations are not being performed, a collar 10 is provided loosely fitting the cylindrical surface of the gaging head 12 and preferably spring-pressed toward its nozzle closing position, as indicated in Fig. 2 by a light spring 14. As soon as a work piece W is applied to the gage head 12 the slidable collar 10 is retracted and upon removal of the work piece W the collar 10 again covers and substantially closes the discharge nozzles 16 provided on the gaging head. The discharge of air through the nozzles 16 therefore is substantially uniform and continuous regardless of whether a work piece W is being gaged or whether the gaging nozzles 16 are covered by the slidable collar 10.

The pressure in the spaces within the gaging head 12 and to which the pressure indicating gage 18 is connected is maintained approximately within the range of the gaging pressures. The indicator 18, therefore, does not have to move from its no pressure reading to gaging pressure indicating position and thus comes more quickly to its gaging position. Also the air spaces within the gage head 12 do not lose their pressure when a work piece is removed from the gaging head and do not have to refill with air at gaging pressure for each gaging operation.

Figure 1:
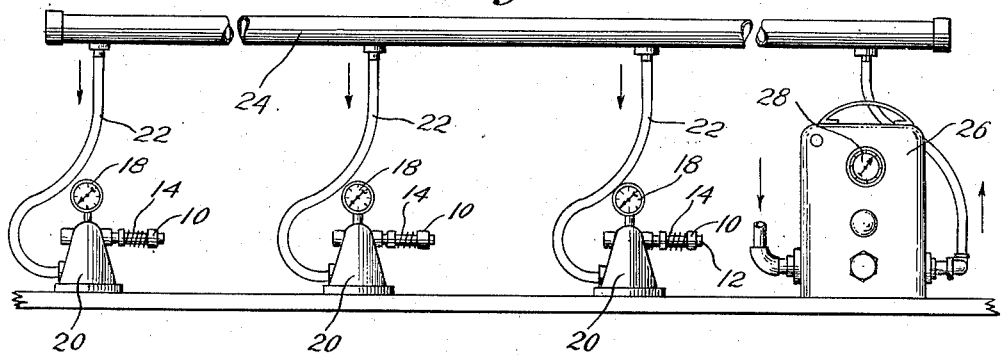
Figure 1 is a diagrammatic view of a pressure regulating device maintaining air within a reservoir constantly at a uniform predetermined pressure to which a number of gaging heads have their air supplies connected.

Fig. 1 shows a group of gages 20 each having a gage head 12 and slidable nozzle covering collar 10. The gage heads 12 may each be adapted for its own dimension and mounted on the gage bodies 20 in the usual manner. Instead of each gage 20 having its own individually regulated air supply, each of the gages 20 in this figure draws its air supply through individual supply lines 22 connected to a single reservoir 24. The reservoir is maintained at a predetermined pressure by regulating device 26, the pressure being indicated by dial gage 28. Air at any pressure above the predetermined pressure in reservoir 24 may be furnished from any source through supply connection 30.

I claim:

1. A gaging head for air gages comprising a cylindrical head having opposed air delivery nozzles therein, a collar mounted on and slidable over said cylindrical head to nozzle covering position, and resilient means normally positioning said collar over said nozzles and permitting retraction of said collar to an inoperative position when a work piece is mounted on said head in gaging position.

2. A gaging head for air gages comprising a cylindrical head having opposed air delivery nozzles therein, a collar mounted on and slidable over said cylindrical head to nozzle covering position, a light helical spring surrounding said head, normally positioning said collar over said nozzles and permitting retraction of said collar to an inoperative position during gaging operations to position a work piece for gaging operation.

3. A gaging head for air gages comprising a cylindrical head having opposed air delivery nozzles therein, a collar mounted on and slidable over said cylindrical head to nozzle covering position, and means normally positioning said collar over said nozzles and permitting retraction of said collar to an inoperative position on said head during gaging operations, said means permitting retraction of said collar by a work piece being moved to its gaging position on the gage head.

4. An air gage comprising in combination, an air supply, a pressure regulating device therefor, a reservoir for air maintained at said regulated pressure by said device, a plurality of gage heads having their air supply from said reservoir, discharge nozzles in said gage heads, and slidable means on each of said heads movable to restrict the flow of air from the discharge nozzles of said gages between gaging operations, said means being retractable when work pieces are individually positioned on said heads in gaging position, and means normally biasing said slidable means to restrict air discharge from said nozzles.

RAYMOND S. FOX.

REFERENCES CITED

The following references are of record in the file of this patent:

UNITED STATES PATENTS

| Number | Name | Date |
|---|---|---|
| 529,221 | Wagner | Nov. 13, 1894 |
| 2,346,406 | Wright | Apr. 11, 1944 |
| 2,357,569 | Wright et al. | Sept. 5, 1944 |
| 2,375,600 | Wattebot | May 8, 1945 |
| 2,408,672 | Mennesson | Oct. 1, 1946 |